US009902900B2

(12) United States Patent
Cho et al.

(10) Patent No.: US 9,902,900 B2
(45) Date of Patent: Feb. 27, 2018

(54) NANOPARTICLE POLYMER AND METHOD OF PREPARING A NANOPARTICLE POLYMER (71) Applicants: SAMSUNG ELECTRONICS CO., LTD., Suwon-si (KR); INDUSTRY-ACADEMIC COOPERATION FOUNDATION, YONSEI UNIVERSITY, Seoul (KR)

(72) Inventors: Kyungsang Cho, Gwacheon-si (KR); Dongho Kim, Seoul (KR); Heejae Chung, Seoul (KR)

(73) Assignee: INDUSTRY-ACADEMIC COOPERATION FOUNDATION, YONSEI UNIVERSITY, Seoul (KR)

(*) Notice: Subject to any disclaimer, the term of this patent is extended or adjusted under 35 U.S.C. 154(b) by 60 days.

(21) Appl. No.: 14/538,556

(22) Filed: Nov. 11, 2014

(65) Prior Publication Data
US 2015/0262727 A1 Sep. 17, 2015

(30) Foreign Application Priority Data

Mar. 14, 2014 (KR) .................. 10-2014-0030462

(51) Int. Cl.
H01B 1/10 (2006.01)
C09K 11/02 (2006.01)
(Continued)

(52) U.S. Cl.
CPC ............ *C09K 11/02* (2013.01); *C09K 11/565* (2013.01); *C09K 11/883* (2013.01); *B82Y 30/00* (2013.01);
(Continued)

(58) Field of Classification Search
CPC ..... C09K 11/02; C09K 11/565; C09K 11/883; B82Y 30/00; B82Y 40/00; Y10S 977/774; Y10S 977/897; Y10S 977/932
(Continued)

(56) References Cited

U.S. PATENT DOCUMENTS 7,402,832 B2    7/2008  Lee
2002/0182632 A1* 12/2002 Anderson .............. B82Y 15/00
                                                   435/7.1
(Continued)

FOREIGN PATENT DOCUMENTS

KR    10-2012-0131945 A    12/2012
KR    10-2013-0015509 A    2/2013

OTHER PUBLICATIONS

Xu et al. "Assembly and Separation of Semiconductor Quantum Dot Dimers and Trimers". Journal of the American Chemical Society. Published Oct. 17, 2011. 18062-18065. Total pp. 4.*
(Continued)

*Primary Examiner* — Mark Kopec
*Assistant Examiner* — Danny N Kang
(74) *Attorney, Agent, or Firm* — Sughrue Mion, PLLC (57) ABSTRACT Provided is a nanoparticle polymer in which a plurality of core particles that are linked to each other by a linker are surrounded by a metal-chalcogenide compound shell. The nanoparticle polymer may include a nanoparticle polymer including a core assembly including at least two nanoparticles connected to each other by a linker; and a shell that surrounds a surface of the core assembly and includes a metal-chalcogenide compound.

14 Claims, 4 Drawing Sheets (51) Int. Cl.
  *B82Y 30/00* (2011.01)
  *C09K 11/56* (2006.01)
  *C09K 11/88* (2006.01)
  *B82Y 40/00* (2011.01)

(52) U.S. Cl.
  CPC ............ *B82Y 40/00* (2013.01); *Y10S 977/774* (2013.01); *Y10S 977/897* (2013.01); *Y10S 977/932* (2013.01)

(58) Field of Classification Search
  USPC ........................................................ 252/500
  See application file for complete search history.

(56) References Cited

U.S. PATENT DOCUMENTS

| 2012/0138866 | A1 | 6/2012 | Agrawal et al. |
| 2013/0078469 | A1 | 3/2013 | Winter et al. |
| 2014/0209837 | A1* | 7/2014 | Barcelo ............... G01N 21/658 252/408.1 |

OTHER PUBLICATIONS

Koole et al. "Electronic Coupling and Exciton Energy Transfer in CdTe Quantum-Dot Molecules". JACS Articles: Published Jul. 20, 2006. Total pp. 6.*

R. Koole et al.; "Electronic Coupling and Exciton Energy Transfer in CdTe Quantum-Dot Molecules"; Journal of the American Chemical Society; vol. 128; No. 32; Jul. 20, 2006; pp. 10436-10441; DOI: 10.1021/ja061608w.

Kyung-Sang Cho et al.; "High-performance crosslinked colloidal quantum-dot light-emitting diodes"; Nature Photonics; vol. 3; May 24, 2009; pp. 341-345; DOI: 10.1038/NPHOTON.2009.92.

X. Xu et al.; "Assembly and Separation of Semiconductor Quantum Dot Dimers and Trimers"; Journal of the American Chemical Society; vol. 133; 2011; pp. 18062-18065; DOI: dx.doi.org/10.1021/ja2077284.

Jungeun Lim et al.; "Preparation of Highly Luminescent Nanocrystals and Their Application to Light-Emitting Dioades"; Advanced Materials; vol. 19; 2007; pp. 1927-1932; DOI: 10.1002/adma.200602642.

* cited by examiner

NANOPARTICLE POLYMER AND METHOD OF PREPARING A NANOPARTICLE POLYMER

RELATED APPLICATIONS

This application claims priority from Korean Patent Application No. 10-2014-0030462, filed on Mar. 14, 2014 in the Korean Intellectual Property Office, the disclosure of which is incorporated by reference herein in its entirety.

BACKGROUND

1. Field

The present disclosure relates to nanoparticles, and more particularly, to nanoparticle polymers and methods of preparing nanoparticle polymers.

2. Description of the Related Art

A nanoparticle polymer refers to an assembly of at least two nanoparticles linked to each other by a linker. A nanoparticle polymer may have characteristics different from those of isolated nanoparticles. For example, electronic interactions between adjacent nanoparticles in a nanoparticle polymer are known to be different from those of isolated nanoparticles (see Xiangxing Xu, et al., "Assembly and Separation of Semiconductor Quantum Dot Dimers and Trimers,", *J. Am. Chem. Soc.* 2011, 133, 18062-18065).

Quantum dots, a type of nanoparticles, are nanoparticles of group II-VI semiconductors, group III-V semiconductors, group I-III-VI semiconductors, or group IV-VI semiconductors. Due to the quantum confinement effect, quantum dots may exhibit high light-extinction performance or high light-emission performance. Accordingly, quantum dots are expected to hold promise for use in photoelectric devices such as, for example, light-emitting devices (LEDs), lasers, or solar cells. In most of these fields of application, assemblies of quantum dots, rather than isolated quantum dots, are required (see Rolf Koole, et al., "Electronic Coupling and Exciton Energy Transfer in CdTe Quantum-Dot Molecules," *J. Am. Chem. Soc.* 2006, 128, 10436-10441).

A related art nanoparticle polymer may be prepared by using a linker to connect nanoparticles that are passivated by an organic ligand. For example, in the article "Electronic Coupling and Exciton Energy Transfer in CdTe Quantum-Dot Molecules," by Rolf Koole, et al., mentioned above, a CdTe quantum dot dimer is disclosed in which two CdTe quantum dots passivated by allylamine are linked via 1,6-hexanedithiol. As another example, in the article "Assembly and Separation of Semiconductor Quantum Dot Dimers and Trimers, by Xiangxing Xu, et al., mentioned above, a quantum dot oligomer is disclosed in which CdSe/CdS/ZnS core-shell quantum dots passivated by oleic acid/oleylamine ligands are linked by terrylene diimide.

However, in such related art nanoparticle polymers obtained using organic ligands and organic linkers, charge transport between adjacent nanoparticles is impossible.

SUMMARY

Exemplary embodiments provide nanoparticle polymers in which a plurality of nanoparticles that are linked to each other by a linker are surrounded by a metal-chalcogenide compound (MCC) shell.

According to an aspect of an exemplary embodiment, there is provided a nanoparticle polymer including a core assembly including at least two nanoparticles connected to each other by a linker; and a shell that surrounds a surface of the core assembly and includes a metal-chalcogenide compound.

According to an aspect of another embodiment, there is provided a method of preparing a nanoparticle polymer, the method including in a solution comprising a linker and nanoparticles passivated by a metal-chalcogenide compound, connecting the nanoparticles via the linker to form polymerized core assemblies; screening the core assemblies by degree of polymerization by using a density gradient centrifugation; and annealing the core assemblies to convert the metal-chalcogenide compound into a shell.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Exemplary embodiments will now be described in detail with reference to the accompanying drawings, wherein like reference numerals refer to like elements throughout. In this regard, the present embodiments may have different forms and the present disclosure should not be construed as being limited to the descriptions set forth herein. As used herein, the term "and/or" includes any and all combinations of one or more of the associated listed items. Expressions such as "at least one of," when preceding a list of elements, modify the entire list of elements and do not modify the individual elements of the list.

Hereinafter, a nanoparticle polymer according to an exemplary embodiment will be described in greater detail with reference to FIG. 1. In the exemplary embodiment of FIG. 1, the nanoparticle polymer 10 is a dimer. That is, two nanoparticles 100 are connected to each other via a linker 200 to form a core assembly in the form of a dimer. A surface of the core assembly, i.e., surfaces of the individual nanoparticles 100 and the linker 200 are surrounded by a shell 300 that includes a metal-chalcogenide compound.

The nanoparticles 100 may any nanoparticles, for example, quantum dots, metal nanocrystals (NCs), magnetic NCs, oxide NCs, nanowires, or nanoplates. For example, the quantum dots may be CdS, CdSe, CdTe, ZnS, ZnSe, ZnTe, ZnO, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, CdHgZnTe, CdZnSeS, CdZnSeTe, CdZnSTe, CdHgSeS, CdHgSeTe, CdHgSTe, HgZnSeS, HgZnSeTe, HgZnSTe, GaN, GaP, GaAs, GaSb, AlN, AlP, AlAs, AlSb, InN, InP, InAs, InSb, GaNP, GaNAs, GaNSb, GaPAs, GaPSb, AlNP, AlNAs, AlNSb, AlPAs, AlPSb, InNP, InNAs, InNSb, InPAs, InPSb, GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, SnS, SnSe, SnTe, PbS, PbSe, PbTe, SnSeS, SnSeTe, SnSTe, PbSeS, PbSeTe, PbSTe, SnPbS, SnPbSe, SnPbTe, SnPbSSe, SnPbSeTe, SnPbSTe, Si, Ge, SiC, SiGe, or a combination thereof. The quantum dots may have, for example, a core-shell structure or a core-shell-shell structure. As an example, the nanoparticles 100 may have a diameter of about 1 nm to about 100 nm.

The linker 200 may be any organic compound having at least two functional groups able to bind to the surfaces of the nanoparticles 100. Non-limiting examples of the linker 200 are diamines, diimides, dithiols, or combinations thereof. A non-limiting example of suitable diamines may be $NH_2$—R1-$NH_2$, where R1 is a C1-C20 divalent aliphatic or aromatic group. Non-limiting examples of suitable diamines may be 1,7-diaminohexane, hydrazine, ethylenediamine, phenylenediamine, or combinations thereof. A non-limiting example of suitable diimides may be terrylene diimide. A non-limiting example of suitable dithiols may be $SH_2$—R2-$SH_2$, where R2 is a C1-C20 divalent aliphatic or aromatic group, and more particularly, for example, 1,6-hexanedithiol.

The nanoparticles 100 are connected to each other by the linker 200. An interval between the nanoparticles 100 may be maintained by the linker 200. The interval between the nanoparticles 100 may vary depending on the linker 200 that is used. Exciton transport characteristics and charge transport characteristics between the nanoparticles 100 may be controlled by adjusting the interval between the nanoparticles 100. For example, the interval between the nanoparticles may be in a range of from about 0.1 nm to about 20 nm. When the interval between the nanoparticles 100 is about 1 nm or less, the charge or exciton transport characteristics may be dramatically improved.

The shell 300 may include at least one metal-chalcogenide compound. The shell 300 may consist of at least one metal-chalcogenide compound. For example, the metal-chalcogenide compound may be a cationic metal-chalcogenide compound, an anionic metal-chalcogenide compound, or a combination thereof. A cationic metal-chalcogenide compound is positively charged in a solution. An anionic metal-chalcogenide compound is negatively charged in a solution. The cationic metal-chalcogenide compound and the anionic metal-chalcogenide compound may bind to anions and cations on the surfaces of the individual nanoparticles 100, respectively, to passivate the nanoparticles 100.

Non-limiting examples of the cationic metal-chalcogenide compounds are $Zn_2S_2$, $Zn_2Se_2$, $Zn_2Te_2$, $Cu_2S_2$, $Cu_2Se_2$, $Cu_2Te_2$, $Mn_2S_2$, $Mn_2Se_2$, $Mn_2Te_2$, $Fe_2S_2$, $Fe_2Se_2$, $Fe_2Te_2$, $Co_2S_2$, $Co_2Se_2$, $Co_2Te_2$, or combinations thereof. These cationic metal-chalcogenide compounds may include positively charged metal atoms. For example, in $Zn_2S_2$ having a bonding structure of Zn—S—S—Zn, one of the valence electrons of Zn is covalently bonded with S, but the other valence electron of Zn is not bonded with S. Zn is a Group 2 element having electron-donor properties, and thus, in a solution, may lose the other valence electron which is not bonded with S. For this reason, the Zn in the Zn—S—S—Zn bonding structure may be positively charged in a solution. According to this mechanism or one similar thereto, the cationic metal-chalcogenide compounds may be positively charged in a solution.

In an exemplary embodiment, the cationic metal-chalcogenide compound may be prepared, for example, by a method that includes: reacting a chalcogen element with $NaBH_4$ to obtain a sodium-chalcogenide compound; reacting the sodium-chalcogenide compound with a metal perchlorate to obtain a metal-chalcogenide perchlorate; and reacting the metal-chalcogenide perchlorate with ethanol amine to obtain the metal-chalcogenide compound. In this method, it is noted that the sodium chalcogenide compound is first prepared as an intermediate which is readily formed, and then Na atoms of the sodium chalcogenide compound may be substituted with, for example, zinc atoms to effectively obtain zinc chalcogenide. For example, the chalcogen compound may be sulfur (S), selenium (Se), or tellurium (Te). Zinc-chalcogenide compounds generated from S, Se, and Te may be, for example, $Zn_2S_2$, $Zn_2Se_2$, and $Zn_2Te_2$, respectively. In the reacting of the chalcogen element with $NaBH_4$ to generate the sodium-chalcogenide compound, the reaction medium may be, for example, methanol, ethanol, butanol, or isopropanol; the reaction atmosphere may be, for example, an oxidation atmosphere or an inert atmosphere; and the reaction temperature may be, for example, in a range of from about 20° C. to about 200° C. In an exemplary embodiment using Se and $NaBH_4$, a sodium-chalcogenide compound (i.e., $Na_2Se_2$) may be obtained according to the following reaction scheme:

$$3Se+2NaBH_4 \rightarrow Na_2Se_2+H_2Se+2B(OC_2H_5)_3+6H_2$$

In the reacting of the sodium-chalcogenide compound with the metal perchlorate to obtain the metal-chalcogenide perchlorate, the reaction medium may be, for example, methanol, ethanol, butanol, or isopropanol; the reaction atmosphere may be, for example, an oxidation atmosphere or an inert atmosphere; and the reaction temperature may be, for example, in the range of from about 20° C. to about 200° C. For example, the metal perchlorate may be zinc perchlorate, tin perchlorate, indium perchlorate, antimony perchlorate, sodium perchlorate, silver perchlorate, iron perchlorate, potassium perchlorate, magnesium perchlorate, barium perchlorate, calcium perchlorate, cadmium perchlorate, aluminum perchlorate, manganese perchlorate, platinum perchlorate, or a combination thereof.

In an embodiment using $Na_2Se_2$ and $Zn(ClO_4)_2$, a zinc-chalcogenide perchlorate (i.e., $Zn_2Se_2(ClO_4)_2$) may be prepared according to the following reaction scheme:

$$Na_2Se_2+2Zn(ClO_4)_2 \rightarrow Zn_2Se_2(ClO_4)_2+2Na(ClO_4)_2$$

In the reacting of the metal-chalcogenide perchlorate with ethanol amine to obtain the metal-chalcogenide compound, the reaction medium may be, for example, ethanol amine, hydrazine, or a hydrazine hydrate; the reaction atmosphere may be, for example, an oxidation atmosphere or an inert atmosphere; and the reaction temperature may be, for example, in a range of from about 20° C. to about 200° C. The metal-chalcogenide compound generated in this step may be in the form of a complex of a metal chalcogenide with ethanol amine, or a metal-chalcogenide coordinated by ethanol amine. In some embodiments, the metal-chalcogenide compound may be in the form of a complex of a metal-chalcogenide with hydrazine or hydrazine hydrate, or a metal-chalcogenide coordinated by hydrazine or hydrazine hydrate.

For example, the anionic metal-chalcogenide compound may be at least one selected from $Sn_2S_6$, $Sn_2Se_6$, $In_2Se_4$, $In_2Te_3$, $Ga_2Se_3$, $CuInSe_2$, $Cu_7S_4$, $Hg_3Se_4$, $Ge_2S$, $Sb_2S_3$, $Sb_2Se_3$, $Sb_2Te_3$, and ZnTe. The anionic metal-chalcogenide compound may be prepared by, for example, a method including adding metal powder to a chalcogen hydrazine hydrate solution which is obtained by dissolving chalcogen powder in a hydrazine hydrate and reacting the chalcogen element with the metal.

The nanoparticle that is surface-stabilized with the anionic metal-chalcogenide compound may be prepared by, for example, a method that includes providing a first organic solution including nanoparticles having a first organic ligand; mixing a hydrazine hydrate solution of the anionic MCC and the first organic solution of the nanoparticle having the first organic ligand to prepare a mixed solution; and stirring the mixed solution to exchange the first organic ligand of the nanoparticle with the anionic MCC hydrazine hydrate.

The anionic MCC hydrazine hydrate is a compound which is formed by bonding the metal-chalcogenide compound and a hydrazine hydrate. The MCC hydrazine hydrate solution is a solution including the MCC hydrazine hydrate. To this end, first, the powder of a chalcogenide element (S, Se, or Te) may be dissolved in a hydrazine hydrate ($N_2H_4.nH_2O$) to prepare a chalcogen hydrazine hydrate solution. For example, sulfur powder may be dissolved in hydrazine monohydrate to prepare a sulfur hydrazine monohydrate solution. As an additional example, instead of hydrazine monohydrate, a hydrazine polyhydrate such as, for example, hydrazine dihydrate, hydrazine trihydrate, hydrate tetrahydrate, hydrazine pentahydrate, or hydrazine hexahydrate, may be used.

Next, a metal in powder form may be added to the chalcogenide hydrazine hydrate solution and then reacted with the same. The metal may include a single metal or a metal compound. For example, the metal may include Sn, Ga, $Cu_2S$, GeS, $Sb_2Se_3$, $Sb_2Te_3$, $In_2Se_3$, ZnTe, or $In_2Te_3$. A further hydrazine hydrate may be added together with the metal powder. The reaction temperature may be in a range of from room temperature to about 200° C. A hydrazine hydrate is a strong reducing agent. Thus, an MCC may be synthesized in a hydrazine hydrate solution. The MCC in the hydrazine hydrate solution may be bonded to the hydrazine hydrate to form an MCC hydrazine hydrate. The MCC hydrazine hydrate may be an MCC hydrazine monohydrate, an MCC hydrazine dihydrate, an MCC hydrazine trihydrate, an MCC hydrazine tetrahydrate, an MCC hydrazine pentahydrate, an MCC hydrazine hexahydrate, or a combination thereof. Hydrazine hydrates are less toxic than hydrazine, and are non-explosive, and thus may be safe for use in synthesis of an MCC.

The precipitate remaining in the reacted solution after the reaction may be removed by, for example, centrifugation, in order to prepare an MCC hydrazine hydrate solution (Solution A). In an embodiment, a solvent for the MCC hydrazine hydrate solution may be a hydrazine hydrate. For example, a hydrazine monohydrate solution of $Ge_2S$, $Sb_2S_3$, $Sb_2Se_3$, $Sn_2S_6$, $Sn_2Se_6$, $In_2Se_4$, $In_2Te_3$, $Ga_2Se_3$, $CuInSe_2$, $Cu_7S_4$, $Hg_3Se_4$, $Sb_2Te_3$, or ZnTe may be prepared.

In some exemplary embodiments, the shell 300 may have a thickness of, for example, from about 0.1 nm to about 10 nm.

In some exemplary embodiments, the metal-chalcogenide compound of the shell 300 may be a p-type or n-type semiconductor. In this case, the shell 300 may provide an electrical connection between the nanoparticles 100. Accordingly, the nanoparticle polymer 10 may function as an exciton transport device when the nanoparticles 100 have light-emission characteristics. Non-limiting examples of a metal-chalcogenide compound having p-type semiconductor characteristics are $Sb_2Te_3$, $In_2Te_3$, ZnTe, or combinations thereof. Non-limiting examples of a metal-chalcogenide compound having n-type semiconductor characteristics are $Sn_2S_6$, $Sn_2Se_6$, $In_2Se_4$, or combinations thereof.

In other exemplary embodiments, the metal-chalcogenide compound of the shell 300 may be an insulating metal-chalcogenide compound having a large band gap. In this case, the nanoparticles 100 may exhibit maximized light-emission characteristics. The exciton transport characteristics between the nanoparticles 100 may be controlled by adjusting the interval between the nanoparticles 100. For example, the insulating metal-chalcogenide compound may have a band gap of about 2.3 eV or greater. Non-limiting examples of the insulating metal-chalcogenide compound are ZnS, $Ga_2S_3$, $Ga_2Se_3$, or combinations thereof.

Figure 1:
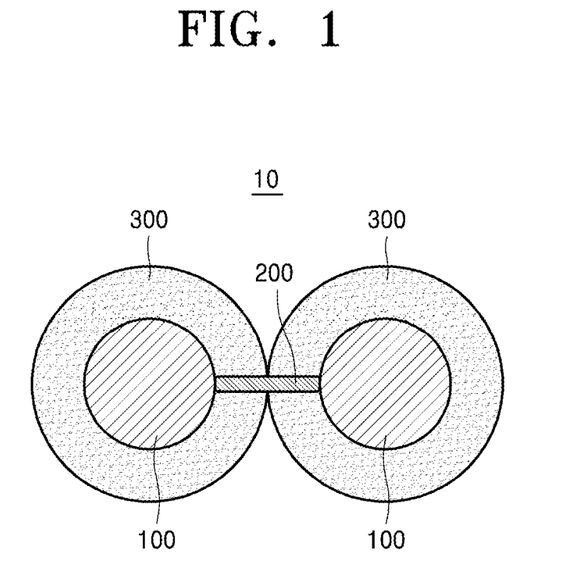
FIG. 1 is a schematic cross-sectional view of a nanoparticle polymer according to an exemplary embodiment.

In the nanoparticle polymer 10 of FIG. 1, materials of the nanoparticle 100 and the shell 300 may be varied so as to control various coupling effects (for example, orbital coupling, magnetic coupling, plasmonic transport, or the like) of the nanoparticle polymer 10. Unlike conventional nanoparticle polymers using organic ligands, it may be possible to measure electrical characteristics of the core assembly (i.e., nanoparticle 100-linker 200-nanoparticle 100) because there is no contact resistance caused by organic ligands in the nanoparticle polymers of the exemplary embodiments.

Figure 2:
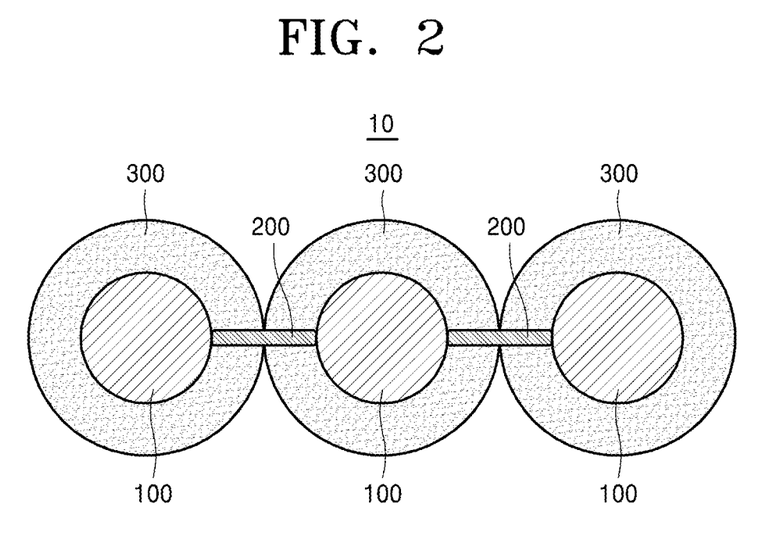
FIG. 2 is a schematic cross-sectional view of a nanoparticle polymer, in which the nanoparticle polymer is a trimer, according to another exemplary embodiment.

In exemplary embodiments, the nanoparticle polymer may include a core assembly in which at least two nanoparticles are connected via a linker. That is, in embodiments, the nanoparticle polymer may have a degree of polymerization of about 2 or greater. As used herein, the degree of polymerization refers to the number of nanoparticles constituting a core assembly. In some embodiments, the nanoparticle polymer may have a degree of polymerization of from about 2 to about 10. The larger the degree of polymerization, the more likely the occurrence of aggregation of the nanoparticles. FIG. 2 is a schematic cross-sectional view of a nanoparticle polymer according to another exemplary embodiment. In the embodiment of FIG. 2, the nanoparticle polymer 10 is a trimer. That is, three nanoparticles 100 are connected to each other via a linker 200 to form a core assembly in the form of a trimer. A surface of the core assembly, i.e., surfaces of the individual nanoparticles 100 and the linker 200, are surrounded by a shell 300 that includes a metal-chalcogenide compound.

Figure 3:
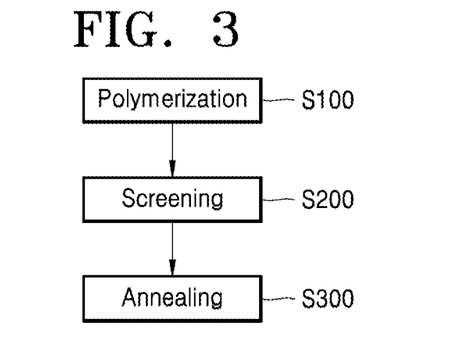
FIG. 3 is a flowchart illustrating a method of preparing a nanoparticle polymer according an exemplary embodiment.
Figure 4:
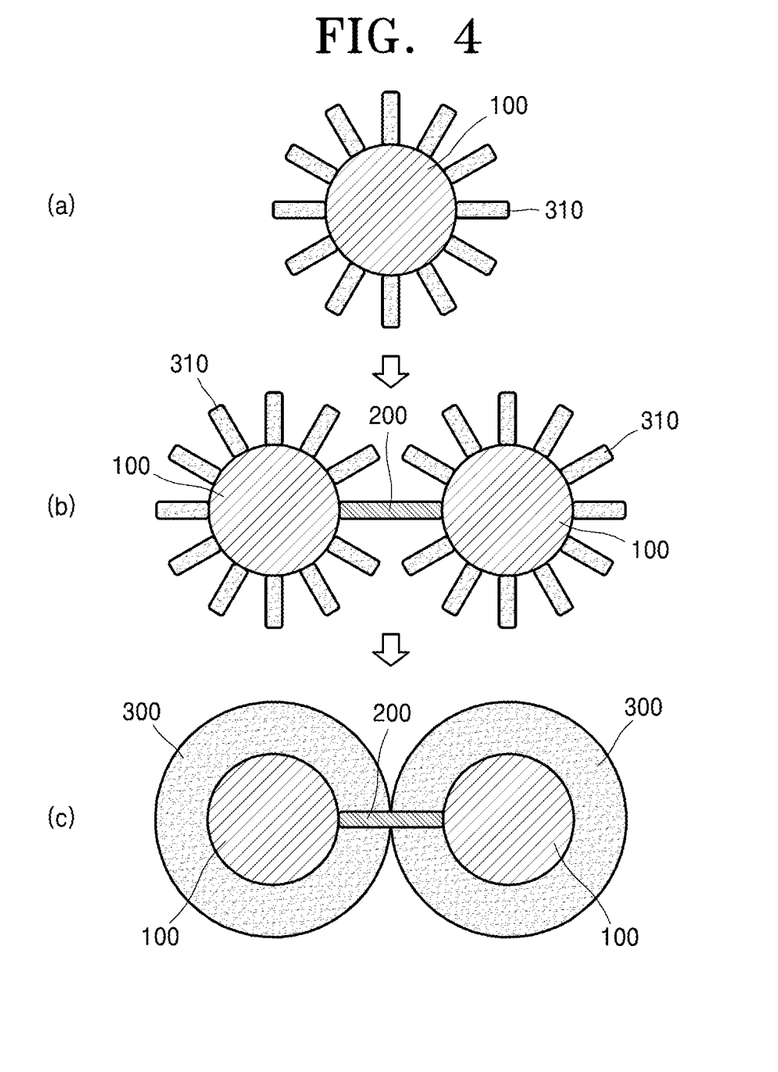
FIG. 4 is schematic cross-sectional views illustrating a method of preparing a nanoparticle polymer according another exemplary embodiment.

Hereinafter, exemplary embodiments of a method of preparing a nanoparticle polymer will be described in greater detail with reference to FIGS. 3 and 4. FIG. 3 is a flowchart of a method of preparing a nanoparticle polymer, according to an exemplary embodiment. In the exemplary embodiment of FIG. 3, the method includes a polymerization step S100, a screening step S200, and an annealing step S300. FIG. 4 is schematic cross-sectional views illustrating a method of forming a nanoparticle polymer, according to another exemplary embodiment.

In the polymerization step (S100), in a solution including nanoparticles passivated by a metal-chalcogenide compound, and a linker, the nanoparticles are connected via the linker, and thus to form a core assembly.

In some exemplary embodiments, the nanoparticles passivated by the metal-chalcogenide compound may be prepared by: providing a first dispersion of nanoparticles having a first organic ligand in a first organic solvent; preparing a second solution of the metal-chalcogenide compound in a second organic solvent; mixing the first dispersion and the second solution to prepare a mixed solution; and stirring the mixed solution to exchange the first organic ligand of the nanoparticles with the metal-chalcogenide compound.

The nanoparticles dispersed in the first dispersion are coordinated by the first organic ligand.

Non-limiting examples of the first organic ligand are trioctylphosphine (TOP), trioctylphosphine oxide (TOPO), oleic acid, oleylamine, octylamine, trioctyl amine, hexadecylamine, octanethiol, dodecanethiol, hexylphosphonic acid (HPA), tetradecylphosphonic acid (TDPA), octylphosphinic acid (OPA), or combinations thereof.

Non-limiting examples of the first organic solvent are cyclohexane, hexane, chloroform, toluene, octane, chlorobenzene, or mixtures thereof.

The second organic solvent, in the second solution, may be an organic solvent capable of dissolving and dispersing the metal-chalcogenide compound and the nanoparticle, respectively. Non-limiting examples of the second organic solvent are ethanolamine, dimethyl sulfoxide (DMSO), dimethylformamide (DMF), formamide, water, hydrazine, hydrazine hydrate, or mixtures thereof.

The first organic ligand coordinated to the nanoparticles may be substituted with the metal-chalcogenide compound by stirring the mixed solution of the first dispersion and the second solution, so that nanoparticles passivated by the metal-chalcogenide compound may be obtained.

In some exemplary embodiments, in the mixed solution, a first organic solvent layer from the first dispersion solution and a second organic solvent layer from the second solution may be phase-separated from each other. In this case, through the stirring of the mixed solution, the nanoparticles in the first dispersion may migrate into the second organic solvent layer, and the first organic ligand passivating the nanoparticles may be exchanged with the metal-chalcogenide compound in the second organic solvent.

The stirring of the mixed solution of the first dispersion and the second solution may be performed, for example, at a temperature of from about 20° C. to about 150° C.

A nanoparticle passivated by a metal-chalcogenide compound is illustrated in view (A) of FIG. 4. Referring to view (A) of FIG. 4, a metal-chalcogenide compound 310 is linked to a surface of a nanoparticle 100.

In the polymerization step S100, in the solution including a linker and nanoparticles passivated by a metal-chalcogenide compound, the nanoparticles and the linkers may be connected by contact with each other. Accordingly, at least two of the nanoparticles may be connected to each other by a linker to form a core assembly. This formed core assembly may have a degree of polymerization of 2 or greater. In FIG. 4, view (B) is a schematic view of a core assembly having a degree of polymerization of 2. The two nanoparticles 100 passivated by the metal-chalcogenide compound 310 are connected to each other by the linker 200.

The solvent used in the solution including the nanoparticles passivated by the metal-chalcogenide compound and the linker may be, for example, water, dimethyl sulfoxide (DMSO), ethanolamine, formamide, tetrahydrofuran (THF), hydrazine monohydrate, or a combination thereof.

In the solution including the linker and the nanoparticles passivated by the metal-chalcogenide compound, an amount of the nanoparticles may be, for example, in a range of from about 0.0001 wt % to about 10 wt % based on 100 wt % of the solution.

In the solution including the linker and the nanoparticles passivated by the metal-chalcogenide compound, an amount of the linker may be, for example, in a range of from about $10^{-10}$ wt % to about 0.01 wt % based on 100 wt % of the solution.

In the solution including the linker and the nanoparticles passivated by the metal-chalcogenide compound, the ratio of the amounts of nanoparticles to linker (by weight) may be, for example, in a range of from about $1:10^{-6}$ to about 1:0.1. The higher the ratio of nanoparticles to linker, the higher the probability for polymerization of the nanoparticles to occur, and thus the average number of nanoparticle polymers having a targeted degree of polymerization also becomes larger. However, when the ratio of nanoparticles to linker is too high, aggregation of the nanoparticles may occur.

In the polymerization step S100, the polymerization temperature may be, for example, in a range of from about 0° C. to about 80° C., and the polymerization time may be, for example, in a range of about 30 seconds to about 60 minutes.

In the screening step S200, the core assemblies may be subjected to density gradient centrifugation and may be screened by degree of polymerization. The centrifugation medium for the density gradient centrifugation may be, for example, an aqueous iodixanol solution. For a density gradient of the centrifugation medium, a concentration of iodixanol may be gradually varied from the uppermost layer to the lowermost layer so as to be from about 40 wt % to about 100 wt %. When the core assemblies are added to the centrifugation medium and then centrifuged, core assemblies having lower degrees of polymerization may become concentrated in an upper layer fraction of the centrifugation medium, while core assemblies having higher degrees of polymerization may become concentrated in a lower layer fraction of the centrifugation medium. In some embodiments, each layer fraction of the centrifugation medium after the density gradient centrifugation may be repeatedly subjected to density gradient centrifugation to more precisely screen the core assemblies according to degrees of polymerization.

In the annealing step S300, the selected core assembly is annealed to convert the metal-chalcogenide compound bound to the surfaces of the nanoparticles into a continuous layer, thus forming a shell surrounding the surface of the core assembly. As a result, a nanoparticle polymer according to an embodiment is obtained. In FIG. 4, view (C) illustrates a shell 300 surrounding the surface of a core assembly (i.e., nanoparticle 100-linker 200-nanoparticle 100). In the annealing step S300, the annealing temperature may be, for example, in a range of from about 60° C. to about 300° C. When the annealing temperature is lower than about 60° C., it may be difficult to effectively change the metal-chalcogenide compound bound to the surfaces of the nanoparticles into a continuous shell layer. When the annealing temperature is higher than about 300° C., the nanoparticles may melt. In the annealing step S300, the annealing time may be, for example, in a range of from about 1 minute to about 600 minutes.

One or more exemplary embodiments will now be described in detail with reference to the following examples. However, these examples are presented for illustrative purposes only and are not intended to limit the scope of the embodiments.

EXAMPLES

Preparation Example 1—Preparation of CdSe/CdS/ZnS Core-Shell-Shell Quantum Dot Passivated by Organic Ligand In Preparation Example 1, CdSe/CdS/ZnS quantum dots having a core-shell-shell structure were prepared with reference to the articles Cho, K.-S. et al., "High-performance crosslinked colloidal quantum-dot light-emitting diodes," *Nature Photon.* 3, 341-345 (2009) and Lim, J. et al., "Preparation of highly luminescent nanocrystals and their application to light-emitting diodes," *Adv. Mater.* 19, 1927-1932 (2007). The CdSe/CdS/ZnS quantum dots having a core-shell-shell structure were high-efficiency nanoparticles having red (615 nm) photoluminescence characteristics (a photoluminescent efficiency of above 70%).

First, 1.6 mmol (0.206 g) of CdO powder (Aldrich, +99.99 wt %), 6.4 mmol (1.8 g) of oleic acid (Aldrich, 95 wt %), and 40 mL of trioctylamine (Aldrich, 90 wt %) were mixed together to obtain a first mixture. Next, the first mixture was heated using a Schlenk line in a vacuum to about 150° C. while stirring, and then heated to about 300° C. while flowing nitrogen ($N_2$). Next, 0.2 mL of a Se (Alfa) solution (2.0M) in trioctylphosphine (Strem, 97 wt %) was rapidly injected into the first mixture at about 300° C. After 90 seconds, a 1.2 mmol n-octanethiol solution in trioctylamine was injected into the first mixture by using a syringe pump at about 1 mL/min for 40 minutes to obtain a first reaction product.

0.92 g of zinc acetate, 2.8 g of oleic acid, and 20 mL of trioctylamine were mixed together, and then heated to about 200° C. using a $N_2$ Schlenk line to prepare a 0.25M Zn precursor solution.

16 mL of the Zn precursor solution (0.25 M, 100° C.) was injected into the first reaction product at about 2 mL/min, and then 6 mL of the n-octanethiol solution (6.4 mmol) in trioctylamine was injected thereinto at about 1 mL/min to obtain a second reaction product. The total reaction time from the injection of Se was about 2 hours.

0.5 g of CdSe/CdS/ZnS quantum dots passivated by an organic ligand was recovered from the second reaction product. Surfaces of the CdSe/CdS/ZnS quantum dots were coordinated with a mixed organic ligand of oleic acid, trioctylphosphine, trioctylphosphine oxide (TOPO), and trioctylamine.

Preparation Example 2—Preparation of CdSe/CdS/ZnS Core-Shell-Shell Quantum Dot Passivated by $GeS_2$ (a) Preparation of $GeS_2$ Solution in Ethanol Amine 0.32 g (10 mmol) of sulfur powder was dissolved in 10 mL of a hydrazine monohydrate to prepare a 1M sulfur solution in hydrazine monohydrate. 1 mL of hydrazine monohydrate was added to 3 mL of the 1M sulfur solution in hydrazine monohydrate, and 105 mg (1 mmol) of GeS powder was added thereto, and stirred at room temperature for about 1 hour to obtain a reaction mixture, followed by adding methanol to the reaction mixture to obtain a precipitate. This precipitate was recovered by centrifugation and then dissolved in ethanol amine to remove excess sulfur.

(b) Preparation of CdSe/CdS/ZnS Quantum Dot Solution in Cyclohexane

The CdSe/CdS/ZnS quantum dots of Preparation Example 1, passivated by the mixed organic ligand, was dispersed (or dissolved) in cyclohexane to prepare a CdSe/CdS/ZnS quantum dot solution (5 mg/mL) in cyclohexane. Surfaces of the CdSe/CdS/ZnS quantum dots were coordinated with a mixed organic ligand of oleic acid, trioctylphosphine, trioctylphosphine oxide (TOPO), and trioctylamine.

(c) Ligand Exchange of CdSe/CdS/ZnS Quantum Dots

25 µL of the $GeS_2$ solution in ethanol amine, prepared in step (a), was added to 2 mL of ethanol amine, and then 2 mL of the CdSe/CdS/ZnS quantum dot solution in cyclohexane, prepared in step (b), was added thereto to obtain a mixed solution. In this mixed solution, an upper cyclohexane layer and a lower ethanol amine layer were phase-separated from each other. The phase-separated mixed solution was stirred at room temperature for about 72 hours, and then left for a while. As a result, the CdSe/CdS/ZnS quantum dots migrated from the upper cyclohexane layer into the lower ethanol amine layer, and consequently, the mixed organic ligand on the surfaces of the CdSe/CdS/ZnS quantum dots was exchanged with $GeS_2$. As a result, CdSe/CdS/ZnS core-shell-shell quantum dots passivated by $GeS_2$ were obtained.

Example 1

1 g of an aqueous solution (quantum dot concentration: 1 wt %) of CdSe/CdS/ZnS core-shell-shell quantum dots (Preparation Example 2) passivated by $GeS_2$ and 1 g of an aqueous solution of 1,7-diaminohexane (as a linker, in a concentration of 0.0001 wt %) were mixed together to obtain a reaction mixture. This reaction mixture was stirred at room temperature for about 60 minutes to obtain core assemblies. The core assemblies were separated from the reaction mixture by a simple centrifugation, and then subjected to density gradient centrifugation using an aqueous iodixanol solution as a centrifugation medium and sorted evenly by height into three fractions, i.e., an upper layer fraction, a middle layer fraction, and a lower layer fraction. The core assemblies obtained from the upper layer fraction and the middle layer fraction were annealed by heating in a $N_2$ atmosphere at about 100° C. for about 30 minutes to obtain a nanoparticle polymer from the upper layer fraction and a nanoparticle polymer from the middle layer fraction.

Comparative Example 1

1 g of an aqueous solution (quantum dot concentration: 1 wt %) of CdSe/CdS/ZnS core-shell-shell quantum dots (Preparation Example 1) passivated by the mixed organic ligand and 1 g of an aqueous solution of 1,7-diaminohexane (as a linker, in a concentration of 0.0001 wt %) were mixed together to obtain a reaction mixture. This reaction mixture was stirred at room temperature for about 60 minutes to obtain core assemblies. The core assemblies were separated from the reaction mixture by a simple centrifugation, and then subjected to density gradient centrifugation using an aqueous iodixanol solution as a centrifugation medium and sorted evenly by height into three fractions, i.e., an upper layer fraction, a middle layer fraction, and a lower layer fraction. The core assemblies obtained from the upper layer fraction and the middle layer fraction were annealed by heating in a $N_2$ atmosphere at about 100° C. for about 30 minutes <SEM Analysis>

Figure 5:
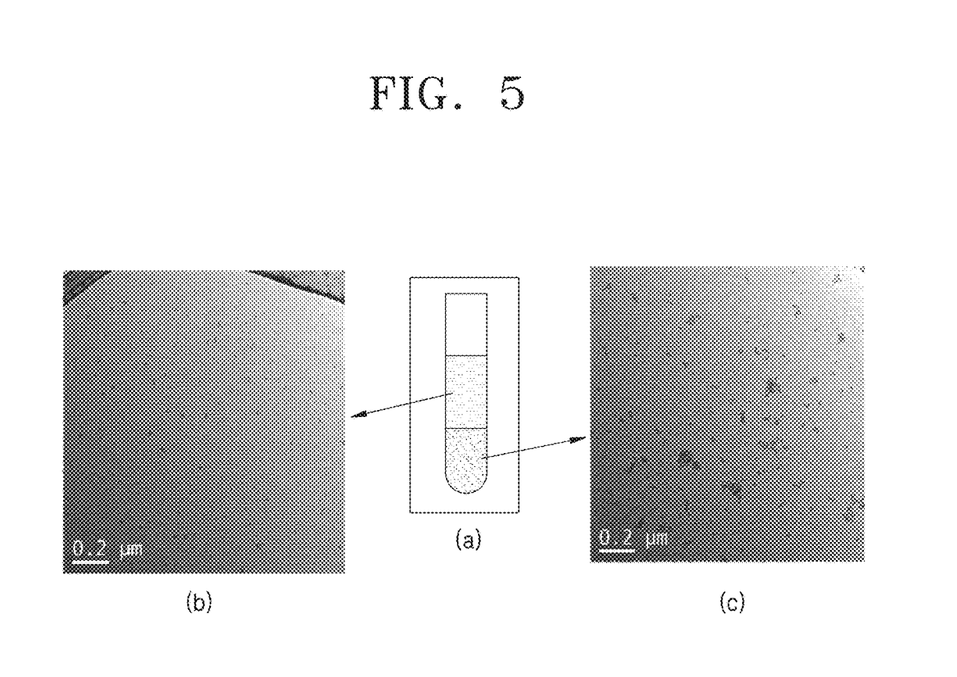
FIG. 5 is a scanning electron microscopic (SEM) image of the nanoparticle polymer prepared in Example 1.

FIG. 5 illustrates scanning electron microscopic (SEM) images of the nanoparticle polymer of Example 1, wherein view (a) is an image illustrating the results from the density gradient centrifugation, view (b) is a SEM image of the nanoparticle polymer obtained from the upper layer fraction; and view (c) is a SEM image of the nanoparticle polymer obtained from the middle layer fraction. The degrees of polymerization of the nanoparticle polymers were measured based on the SEM images in FIG. 5, and the results are shown in Table 1.

TABLE 1

| Example | Number of Monomers | Number of Dimers | Number of Trimers | Number of Tetramers | Number of Pentamers | Number of Hexamers or greater |
|---------|--------------------|------------------|-------------------|---------------------|---------------------|-------------------------------|
| Upper layer fraction (Example 1) | 125 | 30 | 18 | 10 | 9 | 11 |
| Middle layer fraction (Example 1) | 22 | 31 | 19 | 9 | 5 | 43 |

Referring to Table 1, as compared to the upper layer fraction of Example 1, the middle layer fraction of Example 1 included fewer monomers and more dimers or higher polymers.

<Absorption Spectrum and Photoluminescence Spectrum Analysis>

Figure 6A:
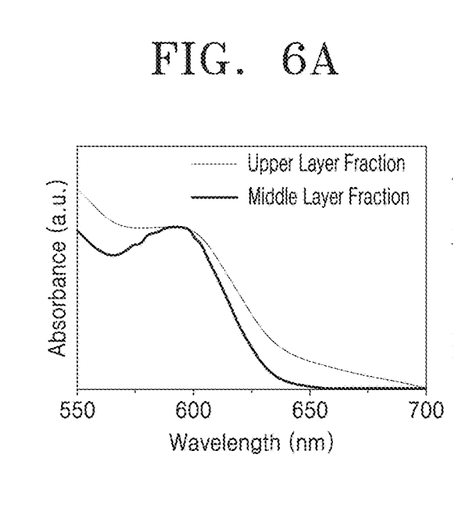
FIGS. 6A and 6B illustrate the absorption spectra and photoluminescence spectra of the nanoparticle polymer of Example 1.
Figure 6B:
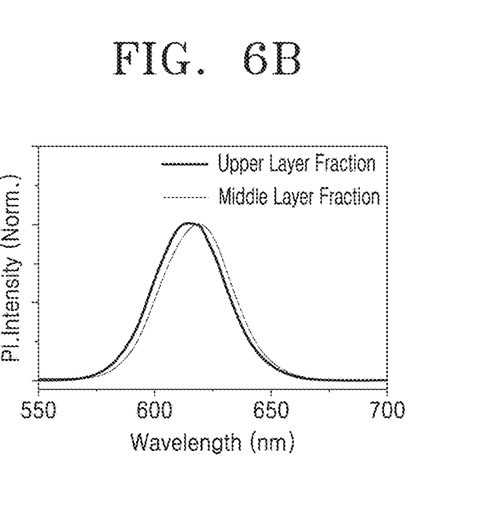

FIGS. 6A and 6B illustrate absorption and photoluminescence spectra of the nanoparticle polymer of Example 1, which were measured using a Carry 5000 (available from Varian Co. U.S.A) FIG. 6A illustrates absorption spectra of the nanoparticle polymers obtained from the upper layer fraction and the middle layer fraction, respectively. Referring to FIG. 6A, the peak wavelength of the upper layer fraction was about 590 nm, and the peak wavelength of the middle layer fraction was about 595 nm. FIG. 6B illustrates photoluminescence (PL) spectra of the nanoparticle polymers obtained from the upper layer fraction and the middle layer fraction, respectively. Referring to FIG. 6B, the peak wavelength of the upper layer fraction was about 625 nm, and the peak wavelength of the middle layer fraction was about 630 nm. As shown in FIGS. 6A and 6B, the peak wavelengths of the nanoparticle polymer obtained from the middle layer fraction were shifted considerably from those of the nanoparticle layer obtained from the upper layer fraction, indicating that the nanoparticle polymer of the middle layer fraction had a lower monomer content, as compared to the nanoparticle polymer of the upper layer fraction. In other words, nanoparticle polymers from the middle layer fraction were effectively formed and sorted.

<Evaluation of Excitonic Coupling Intensity>

Figure 7A:
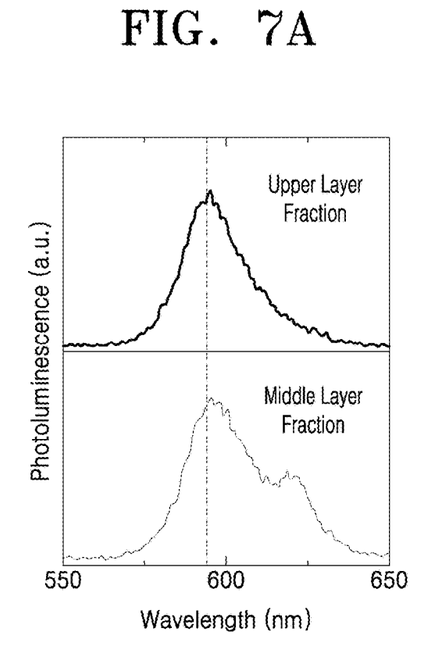
FIGS. 7A and 7B illustrate the analytic results of photoluminescence spectra of the nanoparticle polymer obtained from a middle layer fraction in Example 1, and the nanoparticle polymer obtained from a middle layer fraction in Comparative Example 1.
Figure 7B:
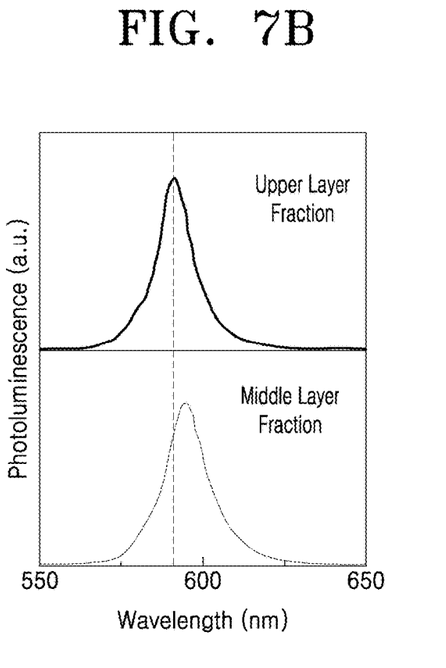

FIGS. 7A and 7B illustrate the analytic results of PL spectra of the nanoparticle polymer obtained from the middle layer fraction in Example 1, and the nanoparticle polymer obtained from the middle layer fraction in Comparative Example 1. The PL spectra of each particle in the nanoparticle polymer were obtained using a single-molecule spectroscopy setup at an excitation wavelength of about 485 nm and at an excitation power of about 100 nW. FIG. 7A illustrates the PL spectra of the nanoparticle polymer obtained from the middle layer fraction in Example 1, and FIG. 7B illustrates the PL spectra of the nanoparticle polymer obtained from the middle layer fraction in Comparative Example 1. Referring to FIGS. 7A and 7B, the peak shift in Example 1 was much greater than that in Comparative Example 1. Accordingly, the nanoparticle polymer can have much higher excitonic coupling intensity, as compared to the nanoparticle polymer of the prior art prepared using an organic ligand/organic linker.

As described above, according to the exemplary embodiment, a nanoparticle polymer may include a core assembly having at least two nanoparticles wherein the core assembly is surrounded by a shell including a metal-chalcogenide compound, and the nanoparticle polymer may be used in thermoelements, exciton emission devices, nanodot memory, or the like.

The exemplary embodiments described herein should be considered to be descriptive only and do not limit the present disclosure. Descriptions of features or aspects within each embodiment should typically be considered as being available for other similar features or aspects in other embodiments.

While exemplary embodiments have been described with reference to the figures, it will be understood by those of ordinary skill in the art that various changes in form and details may be made therein without departing from the spirit and scope of the inventive concept as defined by the following claims.

What is claimed is:

1. A nanoparticle polymer comprising:
   a core assembly comprising at least one linker and at least two nanoparticles connected to each other by the at least one linker; and
   a shell that surrounds an entire surface of the core assembly, including the linker, and comprises a metal-chalcogenide compound.

2. The nanoparticle polymer of claim 1, wherein the linker comprises diamines, diimides, dithiols, or a combination thereof.

3. The nanoparticle polymer of claim 2, wherein the linker comprises diamines, and the diamines are NH2-R1-NH2, where R1 is a C1-C20 divalent aliphatic or aromatic group.

4. The nanoparticle polymer of claim 3, wherein the diamines are 1,7-diaminohexane, hydrazine, ethylenediamine, phenylenediamine, or a combination thereof.

5. The nanoparticle polymer of claim 2, wherein the linker comprises diimides and the diimides are terrylene diimide.

6. The nanoparticle polymer of claim 2, wherein the linker comprises dithiols and the dithiols are SH2-R2-SH2, where R2 is a C1-C20 divalent aliphatic or aromatic group.

7. The nanoparticle polymer of claim 6, wherein the dithiols are 1,6-hexanedithiol.

8. The nanoparticle polymer of claim 1, wherein a distance between the nanoparticles is from about 0.1 nm to about 20 nm.

9. The nanoparticle polymer of claim 1, wherein the metal-chalcogenide compound is a cationic metal-chalcogenide compound.

10. The nanoparticle polymer of claim 1, wherein the metal-chalcogenide compound is an anionic metal-chalcogenide compound.

11. The nanoparticle polymer of claim 1, wherein the shell has a thickness of about 0.1 nm to about 10 nm.

12. The nanoparticle polymer of claim 1, wherein the metal-chalcogenide compound is a p-type or n-type semiconductor.

13. The nanoparticle polymer of claim 1, wherein the metal-chalcogenide compound is an insulating material.

14. The nanoparticle polymer of claim 1, wherein the nanoparticle polymer has a degree of polymerization of from about 2 to about 10.

* * * * *